United States Patent
Bai et al.

(10) Patent No.: US 12,082,191 B2
(45) Date of Patent: Sep. 3, 2024

(54) BEAM FAILURE DETECTION REFERENCE SIGNAL FOR A SECONDARY CELL

(71) Applicant: QUALCOMM Incorporated, San Diego, CA (US)

(72) Inventors: Tianyang Bai, Somerville, NJ (US); Yan Zhou, San Diego, CA (US); Kiran Venugopal, Raritan, NJ (US); Jung Ho Ryu, Fort Lee, NJ (US); Junyi Li, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 303 days.

(21) Appl. No.: 17/028,586

(22) Filed: Sep. 22, 2020

(65) Prior Publication Data

US 2021/0105759 A1   Apr. 8, 2021

Related U.S. Application Data

(60) Provisional application No. 62/910,813, filed on Oct. 4, 2019.

(51) Int. Cl.
*H04W 24/04* (2009.01)
*H04W 72/20* (2023.01)

(52) U.S. Cl.
CPC .......... *H04W 72/20* (2023.01); *H04W 24/04* (2013.01)

(58) Field of Classification Search
CPC .. H04W 72/0406; H04W 24/04; H04B 7/088; H04B 7/0695; H04L 5/0053; H04L 5/0048
See application file for complete search history.

(56) References Cited

U.S. PATENT DOCUMENTS 11,711,803 B2 * 7/2023 Lin ................ H04W 72/04
370/329
2019/0239212 A1   8/2019 Wang et al.
(Continued)

FOREIGN PATENT DOCUMENTS

CN       110062397 A      7/2019
WO    2018190617 A1    10/2018
(Continued)

OTHER PUBLICATIONS

Asustek: "Maintenance for Beam Management", 3GPP Draft, R1-1813574, Maintenance for Beam Management, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018 (Nov. 11, 2018), XP051555628, 5 Pages, Retrieved from the Internet: URL: http://www.3gpp.org/ftp/Meetings%5F3GPP%5FSYNC/RAN1/Docs/R1%2D1813574%2Ezip. [retrieved on Nov. 11, 2018] p. 1-p. 3.

(Continued)

*Primary Examiner* — Syed Ali
(74) *Attorney, Agent, or Firm* — QUALCOMM Incorporated

(57) ABSTRACT

Certain aspects of the present disclosure provide techniques for managing beam failure recovery operations. A method that may be performed by a user equipment (UE) generally includes determining at least one reference signal (RS) associated with a first cell that is configured without a control-resource set (CORESET). The method also includes monitoring the at least one RS associated with the first cell. The method further includes detecting a beam failure on the first cell based on the monitoring of the at least one RS.

27 Claims, 8 Drawing Sheets

(56) References Cited

U.S. PATENT DOCUMENTS

| | | | |
|---|---|---|---|
| 2019/0274098 A1 | 9/2019 | Cheng et al. | |
| 2019/0306924 A1 | 10/2019 | Zhang et al. | |
| 2020/0221428 A1* | 7/2020 | Moon | H04B 7/024 |
| 2020/0229169 A1 | 7/2020 | John Wilson et al. | |
| 2020/0266876 A1* | 8/2020 | Yu | H04W 72/23 |
| 2022/0109547 A1* | 4/2022 | Svedman | H04L 5/0053 |
| 2022/0141693 A1* | 5/2022 | Seo | H04L 5/0023 |
| | | | 370/252 |
| 2022/0150011 A1* | 5/2022 | Kim | H04L 5/0048 |
| 2022/0232603 A1* | 7/2022 | Xiao | H04L 1/1861 |
| 2022/0264430 A1* | 8/2022 | Kim | H04J 11/0073 |
| 2022/0264615 A1* | 8/2022 | Kang | H04B 7/024 |
| 2022/0271894 A1* | 8/2022 | Li | H04W 72/0446 |
| 2022/0304014 A1* | 9/2022 | Li | H04L 5/0092 |
| 2022/0304039 A1* | 9/2022 | Jiang | H04W 72/23 |
| 2022/0338176 A1* | 10/2022 | Lei | H04W 72/23 |
| 2022/0360398 A1* | 11/2022 | Zhang | H04B 7/0695 |

FOREIGN PATENT DOCUMENTS

| | | |
|---|---|---|
| WO | 2019032882 A1 | 2/2019 |
| WO | 2019138081 A1 | 7/2019 |

OTHER PUBLICATIONS

International Search Report and Written Opinion—PCT/US2020/052266—ISA/EPO—Jul. 29, 2021.
Huawei, et al., "RAN2 Aspects of DL Beam Management", 3GPP TSG RAN WG2 #99, R2-1708695, Berlin, Germany, Aug. 21-25, 2017, 4 Pages.

* cited by examiner

BEAM FAILURE DETECTION REFERENCE SIGNAL FOR A SECONDARY CELL

CROSS-REFERENCE TO RELATED APPLICATION

This application claims benefit of and priority to U.S. Provisional Patent Application No. 62/910,813, filed Oct. 4, 2019, which is hereby incorporated by reference in its entirety.

INTRODUCTION

Aspects of the present disclosure relate to wireless communications, and more particularly, to techniques for managing beam failure recovery operations.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that may include one or more techniques for beam failure detection, which may facilitate desirable latencies, data rates, block error rates, etc.

Certain aspects provide a method for wireless communication by a user equipment (UE). The method generally includes determining at least one reference signal (RS) associated with a first cell that is configured without a control-resource set (CORESET). The method also includes monitoring the at least one RS associated with the first cell. The method further includes detecting a beam failure on the first cell based on the monitoring of the at least one RS.

Certain aspects provide a method for wireless communication by a base station (BS). The method generally includes determining one or more transmission configuration indicator (TCI) states associated with at least one RS of a first cell that is configured without a CORESET. The method also includes transmitting, to a UE, one or more indications of the TCI states. The method further includes receiving an indication of a beam failure associated with the at least one RS of the first cell.

Certain aspects provide an apparatus for wireless communication. The apparatus generally includes a memory and a processor coupled to the memory. The processor and the memory are configured to determine at least one RS associated with a first cell that is configured without a CORESET. The apparatus also includes a receiver configured to monitor the at least one RS associated with the first cell. The processor is further configured to detect a beam failure on the first cell based on the monitoring of the at least one RS.

Certain aspects provide an apparatus for wireless communication. The apparatus generally includes a memory and a processor coupled to the memory. The processor and the memory are configured to determine one or more TCI states associated with at least one RS of a first cell that is configured without a CORESET. The apparatus also includes a transmitter configured to transmit, to a UE, one or more indications of the one or more TCI states. The apparatus further includes a receiver configured to receive an indication of a beam failure associated with the at least one RS of the first cell.

Certain aspects provide an apparatus for wireless communication. The apparatus generally includes means for determining at least one RS associated with a first cell that is configured without a CORESET. The apparatus also includes means for monitoring the at least one RS associated with the first cell. The apparatus further includes means for detecting a beam failure on the first cell based on the monitoring of the at least one RS.

Certain aspects provide an apparatus for wireless communication. The apparatus generally includes means for determining one or more TCI states associated with at least one RS of a first cell that is configured without a CORESET. The apparatus also includes means for transmitting, to a UE, one or more indications of the one or more TCI states. The apparatus further includes means for receiving an indication of a beam failure associated with the at least one RS of the first cell.

Certain aspects provide a computer-readable medium having instructions stored thereon to cause a UE to determine at least one RS associated with a first cell that is configured without a CORESET; monitor the at least one RS associated with the first cell; and detect a beam failure on the first cell based on the monitoring of the at least one RS.

Certain aspects provide a computer-readable medium having instructions stored thereon to cause a BS to determine one or more TCI states associated with at least one RS of a first cell that is configured without a CORESET;

transmit, to a UE, one or more indications of the one or more TCI states; and receive an indication of a beam failure associated with the at least one RS of the first cell.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
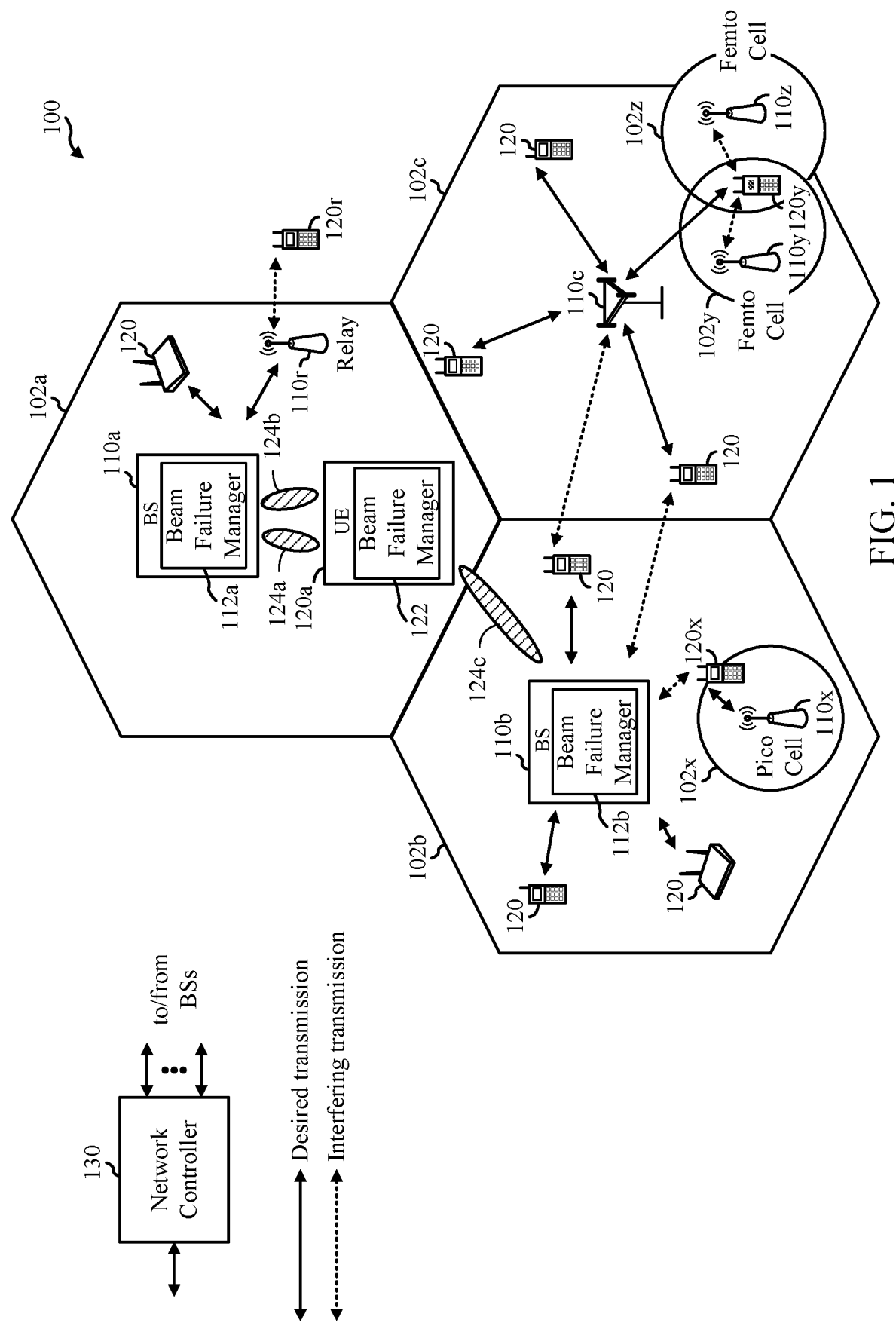
FIG. 1 is a block diagram conceptually illustrating an example telecommunications system, in accordance with certain aspects of the present disclosure.

Aspects of the present disclosure provide apparatus, methods, processing systems, and computer readable mediums for managing beam failure detection. In certain wireless communication systems (e.g., 5G NR), a user equipment (UE) may communicate with a base station (BS) via multiple cells (e.g., a primary cell (Pcell) and at least one secondary cell (Scell)) served by multiple component carriers, which may be referred to as carrier aggregation. If the Scell is configured without a control resource set (CORESET), the UE may not be aware of any reference signals (RSs) to monitor for the beam failure detection and facilitate beam failure recovery. Without the CORESET, this may lead to degraded performance (e.g., reduced bandwidth and/or increased latency) between the UE and the Scell, due to the UE triggering a radio link failure (RLF) and a cell reselection, rather than a beam failure recovery. For example, a physical downlink control channel (PDCCH) to schedule the Scell data may always come from another carrier. In such a case, the Scell may be configured without the CORESET, and the UE may not know of a suitable RS to monitor for the beam failure detection and trigger the RLF and/or the cell reselection, leading to the degraded performance between the UE and the Scell.

Aspects of the present disclosure provide various techniques for determining RSs for a Scell configured without a CORESET, which may provide desirable performance (e.g., a desirable latency, data rate, bandwidth, and/or block error rate (BLER)) of transmissions on the Scell. In certain aspects, the UE may identify the RSs based on transmission configuration indicator (TCI) states associated with a physical downlink shared channel (PDSCH) on the Scell. In some aspects, the UE may be explicitly configured with the TCI states associated with the RSs. In other aspects, the UE may implicitly determine the TCI states associated with the PDSCH on the Scell as suitable substitutes for the RSs.

The following description provides examples of beam failure detection in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As shown in FIG. 1, the BS 110*a* includes a beam failure manager 112*a* (for example, a BS beam failure manager) that may provide the UE 120*a* with one or more TCI states associated with at least one RS of a first cell that is configured without a CORESET, in accordance with aspects of the present disclosure. The UE 120*a* includes a beam failure manager 122 (for example, a UE beam failure manager) that determines the at least one RS associated with the first cell that is configured without the CORESET and uses the determined at least one RS for detecting a beam failure, in accordance with aspects of the present disclosure. In aspects, the UE 120*a* may communicate with the BS 110*a* via one or more first beams 124*a* and one or more second beams 124*b*.

In certain aspects, the first cell may be a secondary cell in a cell group, and the BS 110*a* may configure the UE 120*a* with the TCI states via a second cell, which may be a primary cell in the cell group. In certain cases, the first cell (e.g., the secondary cell) and second cell (e.g., the primary cell) may be integrated with and/or collocated at the BS 110*a*. For example, the UE 120*a* may communicate with the first cell via the first beams 124*a* and communicate with the second cell via the second beams 124*b*.

In certain cases, the first cell may be remotely located from the BS 110*a*. For example, the first cell may be integrated with or collocated at the BS 110*b*, which may also include a beam failure manager 112*b*. In such a case, the UE 120*a* may communicate with the BS 110*b* (and the first cell) via one or more third beams 124*c*, and the UE may communicate with the second cell via the first beams 124*a* or the second beams 124*b*.

NR access (e.g., 5G NR) may support various wireless communication services, such as enhanced mobile broadband (eMBB) targeting wide bandwidth (e.g., 80 MHz or beyond), millimeter wave (mmWave) targeting high carrier frequency (e.g., 25 GHz or beyond), massive machine type communications MTC (mMTC) targeting non-backward compatible MTC techniques, and/or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

As illustrated in FIG. 1, the wireless communication network 100 may include a number of base stations (BSs) 110*a*-*z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. The BSs 110 communicate with user equipment (UEs) 120*a*-*y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile.

Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
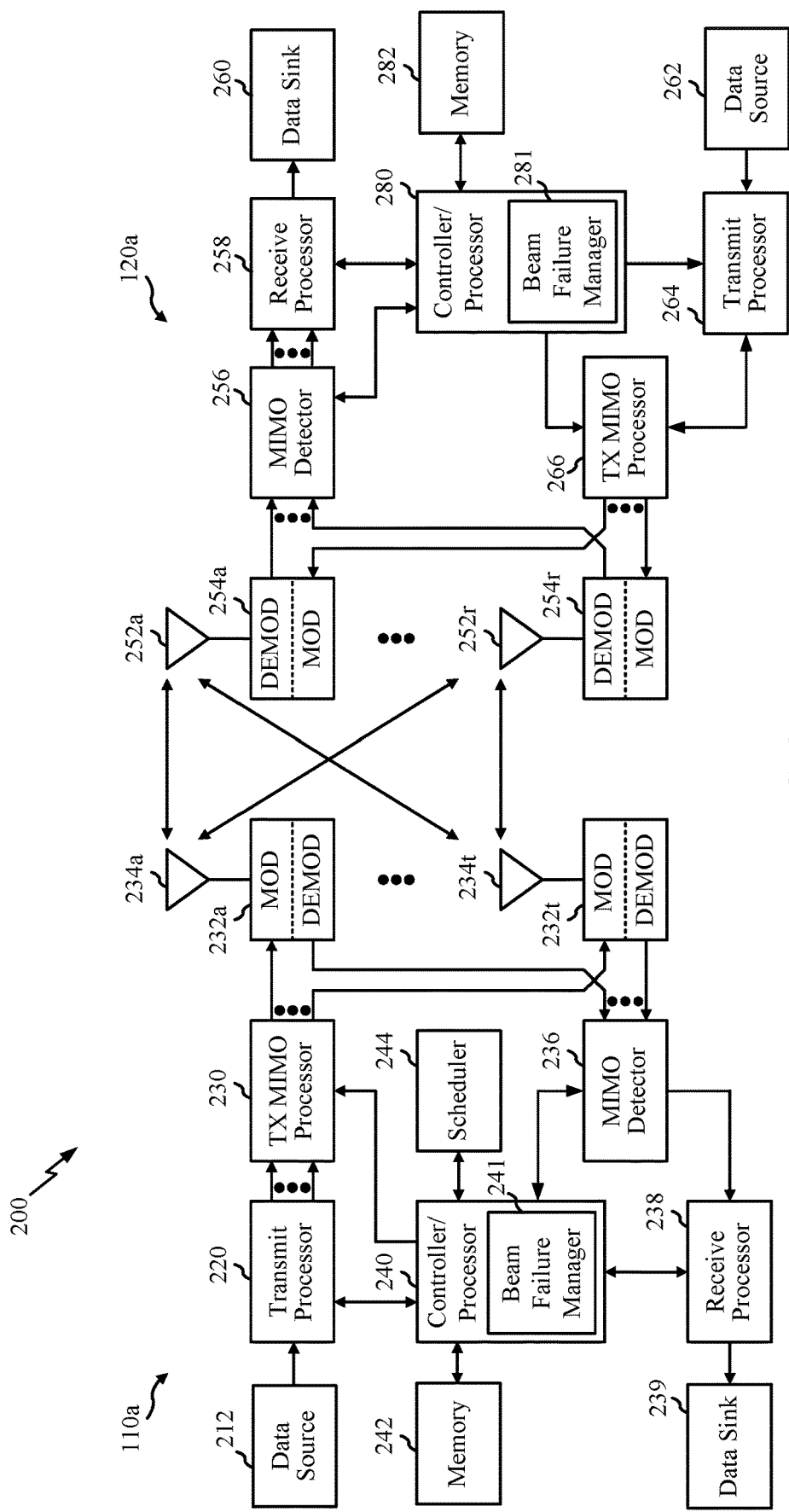
FIG. 2 is a block diagram conceptually illustrating a design of an example base station (BS) and user equipment (UE), in accordance with certain aspects of the present disclosure.

FIG. 2 illustrates example components of BS 110*a* and UE 120*a* (e.g., in the wireless communication network 100 of FIG. 1), which may be used to implement aspects of the present disclosure.

At the BS 110*a*, a transmit processor 220 may receive data from a data source 212 and control information from a controller/processor 240. The control information may be for physical broadcast channel (PBCH), physical control format indicator channel (PCFICH), physical hybrid ARQ indicator channel (PHICH), the PDCCH, group common PDCCH (GC PDCCH), etc. The data may be for the PDSCH, etc. The processor 220 may process (e.g., encode and symbol map) data and control information to obtain data symbols and control symbols, respectively. The transmit processor 220 may also generate reference symbols, such as for primary synchronization signal (PSS), secondary synchronization signal (SSS), and PBCH demodulation reference signal (DMRS). A transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232*a*-232*t*. Each MOD 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the MODs 232*a*-232*t* may be transmitted via antennas 234*a*-234*t*, respectively.

At the UE 120*a*, the antennas 252*a*-252*r* may receive the downlink signals from the BS 110*a* and may provide received signals to demodulators (DEMODs) in transceivers 254*a*-254*r*, respectively. Each DEMOD in the transceiver 254 may condition (e.g., filter, amplify, downconvert, and digitize) a respective received signal to obtain input samples. Each DEMOD in the transceiver 254 may further process the input samples (e.g., for OFDM, etc.) to obtain received symbols. A MIMO detector 256 may obtain received symbols from all the DEMODs in the transceivers 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at the UE 120*a*, a transmit processor 264 may receive and process data (e.g., for the physical uplink shared channel (PUSCH)) from a data source 262 and control information (e.g., for physical uplink control channel (PUCCH) from the controller/processor 280. The transmit processor 264 may also generate reference symbols for a reference signal (e.g., for sounding reference signal (SRS)). The symbols from the transmit processor 264 may be precoded by a TX MIMO precessor 266 if applicable, further processed by the DEMODs in the transceivers 254a-254r (e.g., for SC-FDM, etc.), and transmitted to the BS 110a. At the BS 110a, the uplink signals from the UE 120a may be received by the antennas 234, processed by the MODs 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Memories 242 and 282 may store data and program codes for the BS 110a and the UE 120a, respectively. A scheduler 244 may schedule UEs for data transmission on the downlink and/or the uplink.

The controller/processor 280 and/or other processors and modules at the UE 120a may perform or direct the execution of processes for techniques described herein. For example, as shown in FIG. 2, the controller/processor 240 of the BS 110a has a beam failure manager 241 that may provide the UE 120a with one or more TCI states associated with at least one RS of a first cell that is configured without a CORESET, according to aspects described herein. As shown in FIG. 2, the controller/processor 280 of the UE 120a may include a beam failure manager 281 that determines the at least one RS associated with the first cell that is configured without the CORESET and uses the determined at least one RS for detecting a beam failure, according to aspects described herein. Although shown at the controller/processor, other components of the UE 120a and the BS 110a may be used to perform the operations described herein.

Example Beam Failure Detection for a Secondary Cell

In certain wireless communication systems (e.g., 5G NR), the UE may communicate with the BS via multiple cells (e.g., a Pcell and at least one Scell) served by multiple component carriers, which may be referred to as carrier aggregation. In certain cases, the UE may only receive downlink transmissions (e.g., data transmissions) via the Scell. For example, the UE may receive downlink control signaling from the Pcell (e.g., scheduling resource grants, radio resource control (RRC) signaling, downlink control information (DCI)) on a CORESET of a PDCCH and receive only downlink data transmissions from the Scell, which may be configured without the CORESET for which to receive control signaling. In other cases, the UE may communicate with the Scell via the uplink and downlink transmissions.

In some cases, the carrier aggregation may be used to increase bandwidth of communications between the UE and the BS. In the case of beamformed communication systems (such as, the 5G NR), the carrier aggregation may enable the use of different beams for various traffic flows, such as wide beams for broadcast control signaling or narrow beams for UE-specific data traffic.

Narrow-beam transmission and reception is useful for improving a link budget at millimeter-wave frequencies but may be susceptible to the beam failure. The beam failure generally refers to a scenario in which a quality of a beam for the CORESETs falls below a threshold, which may lead to RLF. NR supports a lower layer signaling to recover from the beam failure, referred to as a beam recovery. For example, instead of initiating a cell reselection when a beam quality becomes too low, a beam pair reselection within the cell may be performed.

The beam failure may be detected by monitoring the RS and assessing if a beam failure trigger condition has been met. The RS maybe a beam failure detection (BFD) RS. For example, the BFD may be triggered if an estimated block error rate (BLER) of the RSs associated with all configured CORESET is above a threshold (e.g., 10%). In other cases, if a measured signal quality (e.g., a reference signal receive power (RSRP)) of the RSs meet certain criterion (e.g., below a certain threshold for a certain time period), a beam failure recovery (BFR) procedure may be initiated. To find candidate new beams, the UE may monitor a beam identification reference signal. When the UE has declared the beam failure and found a new beam, the UE may transmit a beam failure recovery request (BFRQ) message to the serving BS. The BS responds to the request by transmitting a beam failure recovery response (BFRR) over the CORESET (e.g., also referred to as a CORESET-BFR) to the UE and the UE monitors the CORESET for the response. If the response is received successfully, the beam recovery is completed and a new beam pair link (BPL) may be established. If the UE cannot detect any response within a specific time period, the UE may perform a retransmission of the request. If the UE cannot detect any response after a specified number of retransmissions, then the UE may notify higher layers, potentially leading to the RLF and the cell reselection.

Figure 3:
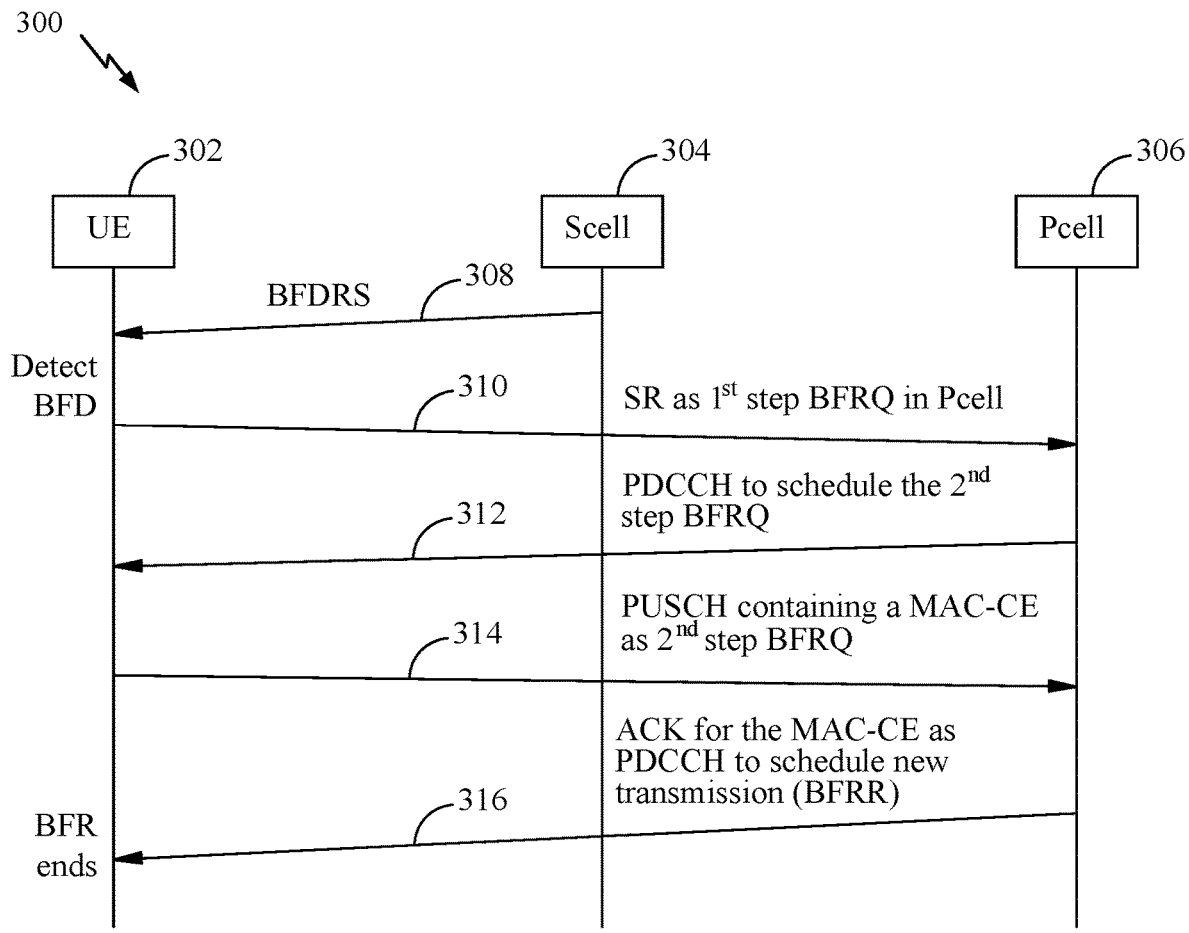
FIG. 3 is an example beam failure detection and recovery procedure, in accordance with certain aspects of the present disclosure.

FIG. 3 is a call flow illustrating example operations 300 for BFD and BFR, in accordance with certain aspects of the present disclosure. A beam failure may be detected by monitoring a RS and assessing if a beam failure trigger condition has been met. The RS may be a BFD RS. As shown in FIG. 3, UE 302 monitors, at 308, the RS from the Scell 304. In some examples, the BFD is triggered if a BLER of the RS associated with a CORESET is above a threshold (e.g., 10%). In some examples, the UE 302 detects the beam failure when reference signal receive power (RSRP) of a BPL is below a threshold.

To recover the Scell 304, the UE 302 can send the BFRQ message on another cell. In some examples, the BFRQ is sent on the Pcell 306, as shown in FIG. 3. In the NR systems, a two-step BFRQ may be used. The BFRQ may request a new transmission. As shown in FIG. 3, after detecting the beam failure, the UE 302 sends a first step (or a first stage) of the BFRQ at 310. The first step of the BFRQ message may include a scheduling request (SR) on the Pcell 306. The SR may be sent on dedicated SR resources. The SR may request scheduling for a second step (or a second stage) of the BFRQ message. As shown in FIG. 3, at 312, the UE 302 may receive a PDCCH from the Pcell 306, in response to the SR, scheduling the second set of the BFRQ message. The UE 302 then sends the scheduled second step of the BFRQ message at 314 on the Pcell 306. For example, the UE 302 sends a PUSCH including a medium access control (MAC) control element (CE), as shown in FIG. 3. The MAC-CE may include an index of failed CC and a new recovery beam candidate beam. In some examples, to find candidate new beams, the UE 302 may monitor a beam identification reference signal.

At 316, the Pcell 306 responds to the BFRQ message by transmitting a BFRR message to the UE 302, as shown in FIG. 3. The BFRR message may acknowledge the MAC-CE and include an uplink grant scheduling a new transmission. For example, the uplink grant may schedule a transmission for a same hybrid automatic repeat request (HARM) process as the PUSCH carrying the MAC-CE in the step two of the BFRQ. In some examples, the BFRR message is sent over the CORESET (e.g., referred to as a CORESET-BFR) the UE 302 monitors for the response.

If the response is received successfully, the beam recovery is completed and a new BPL may be established. If the UE 302 cannot detect any response within a specific time period, the UE 302 may perform a retransmission of the request. If the UE 302 cannot detect any response after a specified number of retransmissions, then the UE 302 may notify higher layers, potentially leading to RLF and cell reselection.

After receiving the BFRR message, at 316, and before the new BPL is established, the UE 302 may communicate on the Scell 304 using a default beam.

In certain cases, the BS may explicitly configure the UE 302 with one or more RSs to detect any beam failures. If not explicitly configured, in a Pcell 306 case, the UE 302 may identify certain RSs (e.g., a channel state information (CSI) RS or a synchronization signal block (SSB)) having a quasi-colocation (QCL) relationship with PDCCH CORESET beams, which may serve as the RSs, such as the BFD RSs. In the Pcell 306 case, the UE 302 may be configured with a certain number (e.g., 3) of CORESETs, but the UE 302 may also be configured with a maximum number of BFD RSs (e.g., 2), which is less than the number of CORESETs. That is, the UE 302 may be configured with more CORESETs than the UE 302 is configured to monitor for the BFD. The UE 302 may implement various criteria to determine which RSs to monitor for a given cell. For example, the UE 302 may select the RSs based on the RS periodicity, such as selecting the RS with the shortest or longest periodicity as the RS, as described in more detail herein. In cases where the periodicities are the same among the RSs, the UE 302 may select the RS to serve as the BFD-RS based on the TCI state identifier value associated with the RS, as described in more detail herein.

In the case of the Scell 304, similar rules may be applied if the Scell 304 is configured with the CORESET. However, if the Scell 304 is configured without the CORESET, the UE 302 may not be aware of any RSs to monitor for the BFD and facilitate the BFR. Without the CORESET, this may lead to degraded performance (e.g., reduced bandwidth and/or increased latency) between the UE 302 and the Scell 304, due to the UE 302 triggering the RLF and the cell reselection, rather than the BFR. For example, the PDCCH to schedule the Scell 304 data may always come from another carrier, which may be referred to as cross-carrier scheduling. In such a case, the Scell 304 may be configured without the CORESET, and the UE 302 may not know of a suitable RS to monitor for the BFD and trigger the RLF and/or the cell reselection, leading to degraded performance between the UE 302 and the Scell 304.

Aspects of the present disclosure provide various techniques for determining the RSs for the Scell 304 configured without the CORESET, which may provide desirable performance (e.g., desirable latency, data rate, bandwidth, and/or BLER) of transmissions on the Scell 304. In certain aspects, the UE 302 may identify the RSs based on the TCI states associated with the PDSCH on the Scell 304. In some aspects, the UE 302 may be explicitly configured with the TCI states associated with the RSs. In other aspects, the UE 302 may implicitly determine the TCI states associated with the PDSCH on the Scell 304 as suitable substitutes for the RSs.

Figure 4:
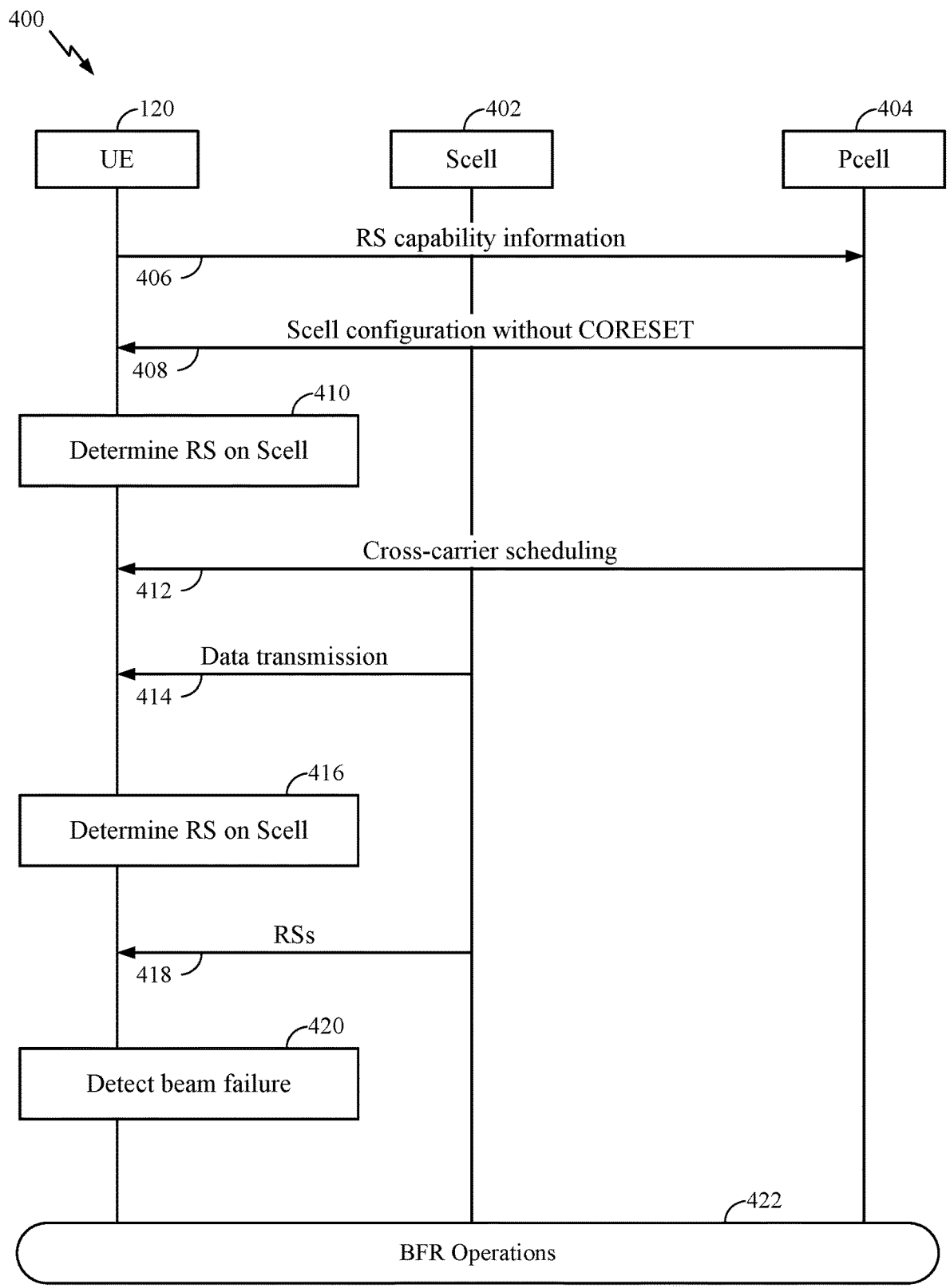
FIG. 4 is a call flow diagram illustrating example operations for determining beam failure detection reference signals for a cell configured without a control-resource set (CORESET), in accordance with aspects of the present disclosure.

FIG. 4 is a call flow illustrating example operations 400 for determining BFD RSs for a cell configured without a CORESET, in accordance with certain aspects of the present disclosure. FIG. 4 is explained in conjunction with FIG. 1. As shown, at 406, a UE 120 (e.g., in a wireless communication network 100 of FIG. 1) may transmit on a Pcell 404, to a BS (e.g., the BS 110a of FIG. 1), an indication of a maximum number of RSs (e.g., 2) that the UE 120 supports per component carrier of a cell. The RSs may correspond to BFD RSs. That is, the UE 120 may provide the BS with the maximum number of RSs that the UE 120 can monitor concurrently for beam failure per component carrier. At 408, the BS may transmit on the Pcell 404, a configuration of the Scell 402 without the CORESET.

In certain aspects, the RSs for the Scell 402 may be configured explicitly. For instance, the configuration, at 408, may provide indications of one or more TCI states associated with the RSs for the Scell 402, and at 410, the UE 120 may determine the RSs associated with the Scell 402 based on the indications of the one or more TCI states. In aspects, the UE 120 may receive explicit signaling of the one or more TCI states associated with the RSs via a RRC configuration message, a MAC-CE, DCI, or a combination thereof.

In certain aspects, the RSs for the Scell 402 may be configured implicitly, for example, if the UE 120 has not received an explicit indication of the RSs for the Scell 402. In aspects, the RSs having a QCL relationship with a PDSCH used for previous transmissions on the Scell 402 may be used as the BFD RSs. As an example, at 412, the UE 120 may receive a resource grant for cross-carrier scheduling on the Pcell 404. At 414, the UE 120 may receive data transmissions associated with the one or more TCI states on the Scell 402. At 416, the UE 120 may determine the RSs for Scell 402 based on the one or more TCI states associated with the transmissions received at 416.

In other aspects, at 416, the UE 120 may determine the RSs for the Scell 402 based on various criteria related to the one or more TCI states associated with the Scell 402. As an example, the UE 120 may identify the RSs associated with PDSCH TCI states, on the Scell 402, having lowest and/or second lowest identifier values (e.g., the RRC information element TCI-StateId) as the RS for the Scell 402. In other aspects, the UE 120 may identify the RSs associated with PDSCH TCI states, on the Scell 402, based on the periodicity of the RSs. For example, multiple RSs may be associated with (e.g., quasi-co located with) the PDSCH TCI states. The UE 120 may select the RS with the shortest (or longest) periodicity (or a suitable periodicity based on a latency of the PDSCH) to serve as the BFD-RS. In cases where the periodicities are same among candidate RSs, the UE 120 may select the RS based on the TCI state identifier value (e.g., select the RS having a lowest or highest TCI state identifier value), as described in more detail herein.

At 418, the UE 120 may monitor the RSs, associated with the Scell 402, which were determined at 410 and/or 416. For instance, monitoring the RSs may include receiving the RSs and measuring various signal quality characteristics of the RSs, such as RSRP. At 420, the UE 120 may detect a beam failure based on various criteria associated with the RSs, for example, if the RSRP of the RSs is below a threshold for a certain period. At 422, the UE 120 and/or the BS may perform the BFR operations, for example, operation 300 as described herein.

Figure 5:
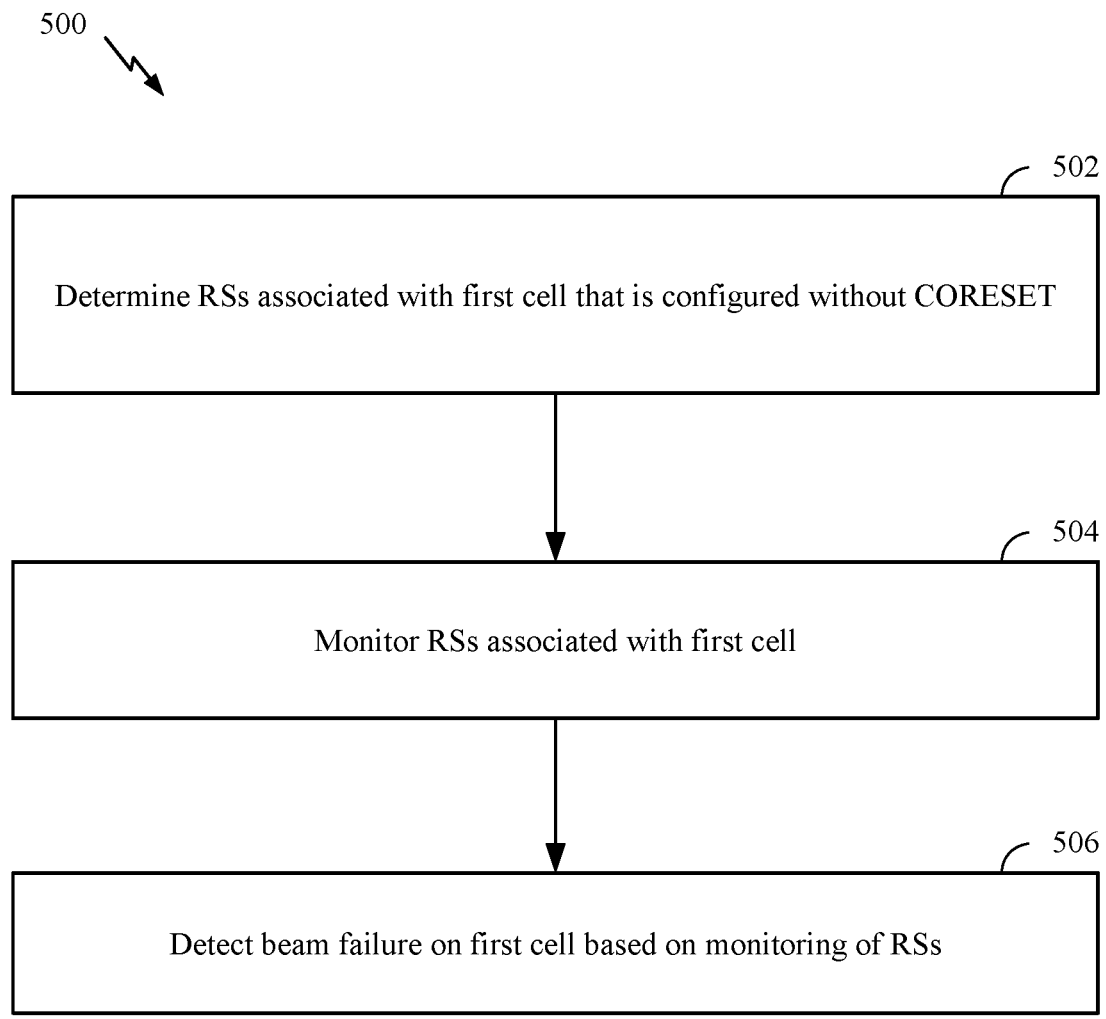
FIG. 5 is a flow diagram illustrating example operations for wireless communication by a UE, in accordance with certain aspects of the present disclosure.

FIG. 5 is a flow diagram illustrating example operations 500 for wireless communication, in accordance with certain aspects of the present disclosure. FIG. 5 is explained in conjunction with FIG. 1, FIG. 2 and FIG. 4. The operations 500 may be performed, for example, by a UE (e.g., a UE 120a in the wireless communication network 100 of FIG. 1).

The operations 500 may be implemented as software components that are executed and run on one or more processors (e.g., a controller/processor 280 of FIG. 2). Further, the transmission and reception of signals by the UE in the operations 500 may be enabled, for example, by one or more antennas (e.g., antennas 252 of FIG. 2). In certain aspects, the transmission and/or reception of the signals by the UE may be implemented via a bus interface of the one or more processors obtaining and/or outputting signals.

The operations 500 may begin at 502, where the UE may determine one or more RSs associated with a first cell (e.g., the Scell 402) that is configured without a CORESET. The one or more RSs may be one or more BFD RSs. At 504, the UE may monitor the one or more RSs associated with the first cell. At 506, the UE may detect a beam failure on the first cell based on the monitoring of the one or more RSs. Upon detecting the beam failure, the UE may perform BFR operations, for example, operation 300 as described herein.

In certain aspects, the BS may explicitly configure the UE with the one or more RSs to detect any beam failures. For example, with respect to the operations 500, the UE may receive, from the BS (e.g., the BS 110a of FIG. 1), one or more indications of one or more TCI states associated with the one or more RSs. The determination of the one or more RSs at 502 may be based on the indication of the one or more TCI states. In aspects, the one or more TCI states are associated with a PDSCH on the first cell. The one or more TCI states may indicate at least one QCL relationship associated with the PDSCH on the first cell. For instance, a TCI state may indicate a RS (e.g., a non-zero power (NZP) CSI-RS or a SSB) of the one or more RSs that may substitute as a BFD RS for the PDSCH on the first cell based on various QCL parameters including Doppler shift, Doppler spread, average delay, delay spread, and/or a spatial reception parameter. In some aspects, the TCI state may indicate the first cell (e.g., Scell and/or Pcell) in which the RS is configured. The UE may receive, from the BS, the indications of the one or more TCI states associated with the one or more RSs via at least one of a RRC configuration message, a MAC-CE, DCI, or a combination thereof.

In some aspects, when the Scell is configured without the CORESET or configured with BFR resource, the UE may also be explicitly configured with the one or more RSs to detect any beam failures. For instance, the UE may receive, from the BS, the RRC configuration message that indicates a BFR configuration (e.g., BeamFailureRecoveryConfig) and the one or more TCI states associated with the one or more RSs for the Scell. In certain aspects, the BFR configuration may include the indication of the one or more TCI states associated with the one or more RSs for the Scell. In other cases, the UE may receive, from the BS, the RRC configuration message that indicates the first cell is configured without the CORESET and the indication of the one or more TCI states associated with the one or more RSs for the Scell. In certain aspects, the configuration for the Scell (e.g., a CellGroupConfig via a ServingCellConfig) may indicate the one or more TCI states associated with the one or more RSs for the Scell.

According to certain aspects, the UE may be implicitly configured with the one or more TCI states associated with the one or more RSs. In aspects, the one or more TCI states may indicate the at least one QCL relationship associated with the PDSCH on the first cell. For instance, the TCI state may indicate the RS (e.g., a NZP CSI-RS or a SSB) of the one or more RSs that may substitute as the BFD RS for the PDSCH on the first cell based on the various QCL parameters including the Doppler shift, the Doppler spread, the average delay, the delay spread, and/or the spatial reception parameter. In certain cases, the QCL relationship may include the spatial reception parameter associated with the PDSCH on the first cell.

As an example of an implicit configuration, with respect to the operations 500, the UE may determine the one or more RSs based on the one or more TCI states associated with the first cell. As used herein, the one or more TCI states associated with the first cell may include the one or more TCI states associated with the Pcell and/or the Scell. For instance, the UE may identify the one or more TCI states with the one or more RSs, on the Pcell, having the QCL relationship with the PDSCH on the Scell, and the UE may monitor the one or more RSs on the Pcell for the beam failures associated with the Scell.

According to certain aspects, the UE may identify the one or more TCI states for the BFD based on one or more identifier values associated with the one or more TCI states. For instance, determining the one or more RSs at 502 may further include the UE identifying the one or more TCI states among a plurality of TCI states associated with the first cell based on a plurality of identifier values (e.g., TCI-StateId) associated with the plurality of TCI states. For instance, the UE may identify two or more TCI states having a lowest and/or a second lowest identifier values among the plurality of identifier values associated with the plurality of TCI states. In other cases, the UE may identify two or more TCI states having the highest and/or the second highest identifier values among the plurality of identifier values associated with the plurality of TCI states.

In certain aspects, the UE may identify the one or more TCI states for the BFD based on periodicities associated with the one or more RSs. For instance, the determining the one or more RSs at 502 may further include identifying the one or more RSs associated with the one or more TCI states based on the periodicities of the one or more RSs, and identifying the one or more RSs as one or more BFD RS. For example, two RSs may be quasi-co located with the same TCI states. In this case, the UE may select the one or more RSs having a lowest periodicity. As another example, when the one or more BFD-RSs are not configured explicitly, and the SCell is not configured with the CORESET, the UE may first identify candidate BFD-RSs that are associated with (e.g., QCLed with) the PDSCH beam. If there are more candidate RSs than a maximum number of the BFD-RSs allowed (e.g., the maximum number of BFD-RSs may be identified based on gNB indication or UE capability), then the UE down selects the candidate RSs for the BFD based on a rule. For instance, the UE may first pick the one or more RSs with the smallest periodicity, as described herein. If multiple RSs have the same periodicity, then the remaining RSs may be down selected using another rule, such as by TCI state ID, as described herein.

In some aspects, the UE may identify the one or more TCI states associated with previous transmission on the the Scell 402 as the one or more TCI states corresponding to the one or more RSs. For instance, with respect to the operations 500, the UE may receive the transmissions from the BS via the first cell, and the determination of the one or more RSs at 502 may include the UE identifying the one or more TCI states associated with the transmissions (for example, on the PDSCH) as including the one or more TCI states associated with the one or more RSs. That is, the one or more TCI states associated with the previous transmissions on the PDSCH of the Scell may also serve as the one or more TCI states for detecting a beam failure on the Scell.

In some aspects, the UE may use the implicit configuration of the one or more RSs, as described herein, if the UE does not receive an explicit indication of the one or more TCI states associated with the one or more RSs. For instance, with respect to the operations 500, the UE may receive, from the BS, a configuration of the first cell, and the determination of the one or more RSs may further comprise the UE identifying the one or more TCI states among the plurality of TCI states, based on the configuration of the first cell if the first cell is configured without a TCI state associated with the one or more RSs.

In other aspects, the UE may use the implicit configuration of the one or more RSs, as described herein, if the UE is under-provisioned with the one or more TCI states associated with the one or more RSs. That is, if the number of explicitly configured one or more RSs is less than or equal to a threshold (e.g., the maximum number of one or more RSs the UE can support monitoring per CC), the UE may use the implicit configuration of the one or more RSs for the remaining RSs. For example, with respect to the operations 500, the UE may receive, from the BS, an indication of the one or more TCI states associated with the one or more RSs. The determination of the one or more RSs at 502 may further comprise the UE determining, if a number of the one or more TCI states is less than or equal to a threshold (e.g., a number of the one or more RSs), a first set of one or more RSs based on the indicated one or more TCI states and a second set of one or more RSs based on one or more additional TCI states associated with the first cell, where the one or more RSs may include the first set of RSs and the second set of RSs. That is, the first set of one or more RSs may include the explicitly configured RSs, and the second set of one or more RSs may include the implicitly configured RSs.

In certain aspects, the UE may provide the BS with the RS capability information, which may enable the BS to configure the UE with a suitable number of RSs as further described herein. As an example, with respect to the operations 500, the UE may transmit, to the BS, an indication of a maximum number of RSs that the UE supports per component carrier of the first cell. That is, the UE may provide the BS with the maximum number of RSs that the UE can monitor concurrently for the beam failure per component carrier.

In some aspects, with respect to the operations 500, the first cell may be a secondary cell in carrier aggregation, such as the Scell 402. For example, the UE may communicate, with the BS, via the first cell and one or more second cells, where, in certain cases, the first cell is a secondary cell in a cell group, the one or more second cells includes a primary cell (e.g., the Pcell 404) in the cell group, and the primary cell is configured with the CORESET. As another example, the UE may receive, from the BS on the one or more second cells, signaling for cross-carrier scheduling of transmissions on the first cell.

Figure 6:
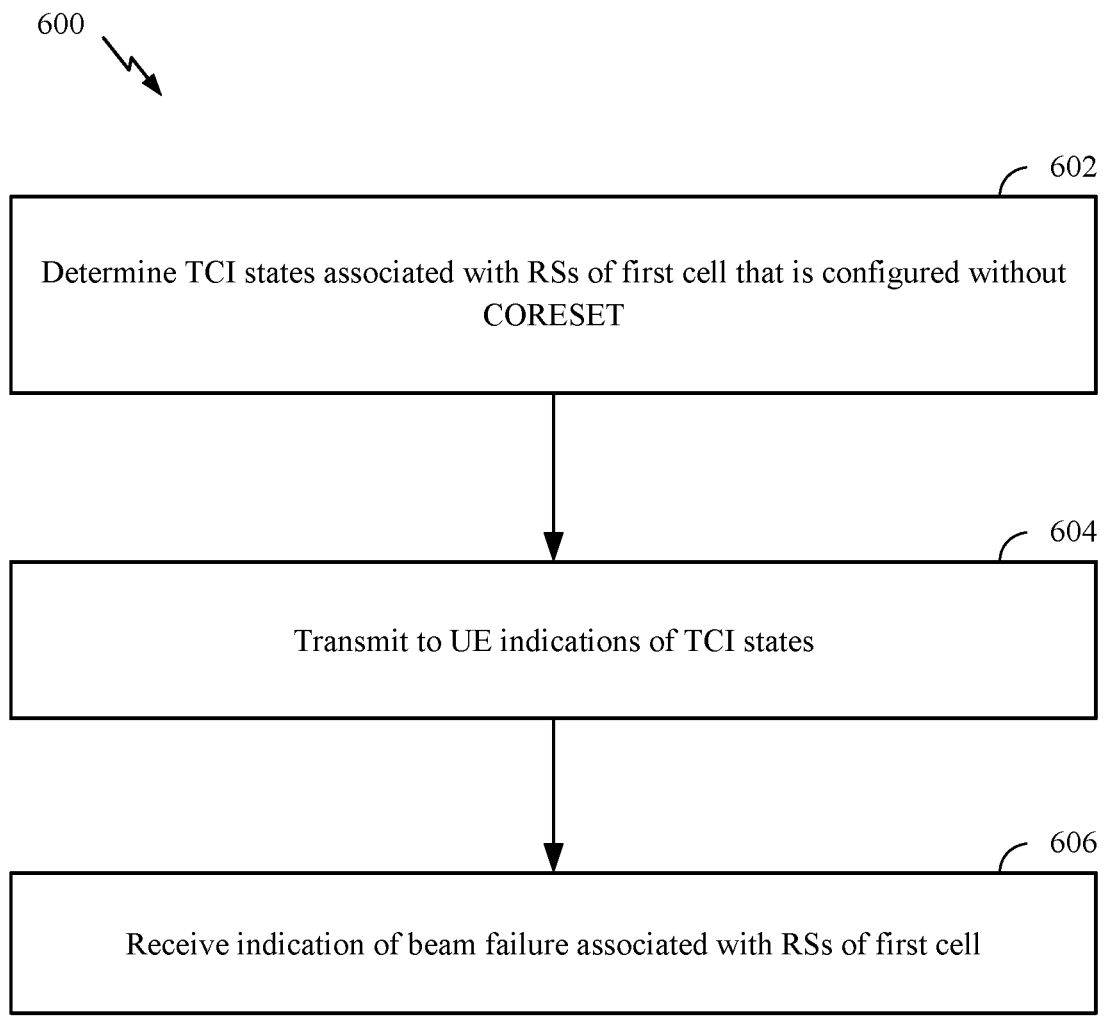
FIG. 6 is a flow diagram illustrating example operations for wireless communication by a BS, in accordance with certain aspects of the present disclosure.

FIG. 6 is a flow diagram illustrating example operations 600 for wireless communication, in accordance with certain aspects of the present disclosure. FIG. 5 is explained in conjunction with FIG. 1 and FIG. 2. The operations 600 may be performed, for example, by a BS (e.g., the BS 110a in the wireless communication network 100 of FIG. 1). The operations 600 may be complimentary to the operations 500 performed by the UE. Operations 600 may be implemented as software components that are executed and run on one or more processors (e.g., a controller/processor 240 of FIG. 2). Further, the transmission and reception of signals by the BS in the operations 600 may be enabled, for example, by one or more antennas (e.g., antennas 234 of FIG. 2). In certain aspects, the transmission and/or reception of the signals by the BS may be implemented via a bus interface of one or more processors (e.g., the controller/processor 240) obtaining and/or outputting the signals.

The operations 600 may begin at 602, where the BS may determine one or more TCI states associated with one or more RSs of a first cell (e.g., the Scell 402) that is configured without a CORESET. At 604, the BS may transmit, to a UE (e.g., the UE 120a in the wireless communication network 100 of FIG. 1), one or more indications of the one or more TCI states. At 606, the BS may receive an indication of a beam failure associated with the one or more RSs of the first cell. Upon receiving an indication of the beam failure, the BS may perform BFR operations, for example, operation 300 as described herein.

In certain aspects, the BS may explicitly configure the UE with the one or more RSs to detect any beam failures. In aspects, the one or more TCI states are associated with a PDSCH on the first cell. The one or more TCI states may indicate at least one QCL relationship associated with the PDSCH on the first cell. For instance, a TCI state may indicate a RS (e.g., a NZP CSI-RS or a SSB) of the one or more RSs that may substitute as a BFD RS for the PDSCH on the first cell based on various QCL parameters including Doppler shift, Doppler spread, average delay, delay spread, and/or a spatial reception parameter. In some aspects, the TCI state may indicate the first cell (e.g., Scell and/or Pcell) in which the RS is configured. The BS may transmit, to the UE, the indications of the one or more TCI states associated with the one or more RSs via at least one of a RRC configuration message, a MAC-CE, DCI, or a combination thereof.

In some aspects, when the Scell is configured without the CORESET or configured with BFD resource, the UE may also be explicitly configured with the one or more RSs to detect any beam failures. For instance, the BS may transmit, to the UE, the RRC configuration message that indicates a BFR configuration (e.g., BeamFailureRecoveryConfig) and the one or more TCI states associated with the one or more RSs for the Scell. In certain aspects, the BFR configuration may include the indication of the one or more TCI states associated with the one or more RSs for the Scell. In other cases, the BS may transmit, to the UE, the RRC configuration message that may indicate that the first cell is configured without the CORESET and an indication of the one or more TCI states associated with the one or more RSs for the Scell. In certain aspects, the configuration for the Scell (e.g., a CellGroupConfig via a ServingCellConfig) may indicate the one or more TCI states associated with the one or more RSs for the Scell.

In certain aspects, the BS may receive, from the UE, BFD RS capability information, which may enable the BS to configure the UE with a suitable number of RSs. With respect to the operation 600, the BS may receive, from the UE, an indication of a maximum number of RSs that the UE supports per component carrier of the first cell. The determination of the one or more TCI states at 602 may be based on the indication of the maximum number of RSs. For example, the BS may determine that the UE can monitor a maximum of two RSs per component carrier of the first cell. As such, the BS may transmit, at 602, an indication of two TCI states associated with the RSs for the BFD on the Scell.

In aspects, with respect to the operations 600, the first cell may be a secondary cell in carrier aggregation. For example, the BS may communicate, with the UE, via the first cell (e.g., the Scell 402) and one or more second cells (e.g., the Pcell 404), where, in certain cases, the first cell is a secondary cell in a cell group, the one or more second cells includes a primary cell in the cell group, and the primary cell is configured with a CORESET. In aspects, the first cell and/or second cell may be collocated at and/or integrated with the BS of the operations 600. In certain aspects, the first cell may be remotely located from the BS, and the second cell may be collocated at and/or integrated with the BS. For example, the second cell may collocated at and/or integrated with the BS 110a of FIG. 1, and the first cell may be collocated at and/or integrated with the BS 110b of FIG. 1. As an example, the BS may transmit, to the UE on the one or more second cells, signaling for cross-carrier scheduling of transmissions on the first cell.

Figure 7:
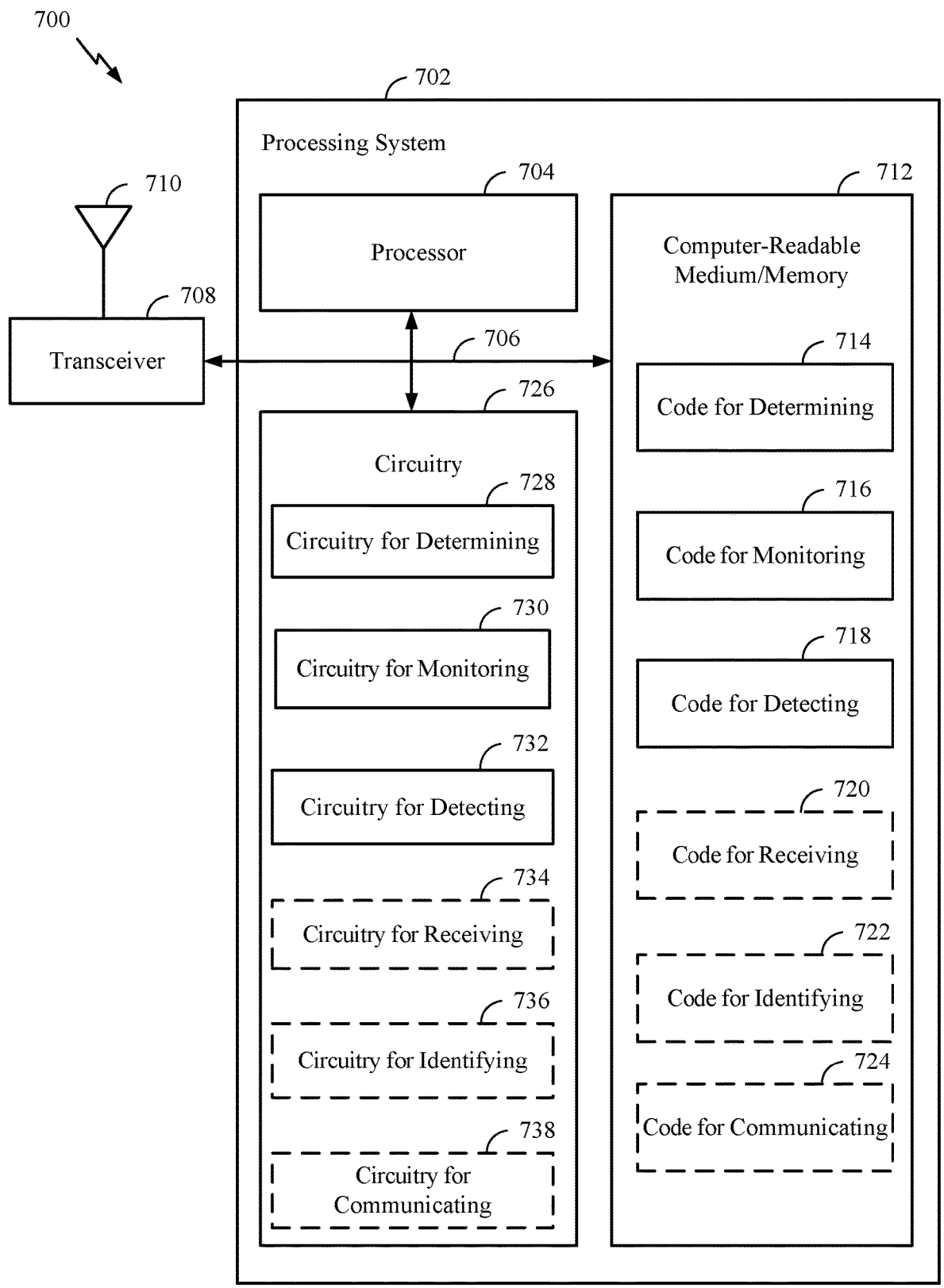
FIG. 7 illustrates a communications device that may include various components configured to perform operations for the techniques disclosed herein in accordance with aspects of the present disclosure.

FIG. 7 illustrates a communications device 700 (e.g., the UE 120a in the wireless communication network 100 of FIG. 1) that may include various components (e.g., corresponding to means-plus-function components) configured to perform operations for techniques disclosed herein, such as the operations illustrated in FIG. 5. The communications device 700 includes a processing system 702 coupled to a transceiver 708 (e.g., a transmitter and/or a receiver). The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 5, or other operations for performing the various techniques discussed herein for beam failure recovery. In certain aspects, the computer-readable medium/memory 712 stores code for determining 714, code for monitoring 716, code for detecting 718, code for receiving 720, code for identifying 722, and/or code for communicating 724. In certain aspects, the processing system 702 has circuitry 726 configured to implement the code stored in the computer-readable medium/memory 712. The circuitry 726 is coupled to the processor 704 and/or the computer-readable medium/memory 712 via the bus 706. For example, the circuitry 726 includes circuitry for determining 728 (an example of means for determining), circuitry for monitoring 730 (an example of means for monitoring), circuitry for detecting 732 (an example of means for detecting), circuitry for receiving 734 (an example of means for receiving), circuitry for identifying 736 (an example of means for identifying), and/or circuitry for communicating 738 (an example of means for communicating).

Means for determining may include a processor (e.g., the controller/processor 280) and/or circuitry for determining (e.g., the circuitry for determining 728). Means for monitoring may include a processor (e.g., the controller/processor 280) and/or circuitry for monitoring (e.g., the circuitry for monitoring 730). Means for detecting may include a processor (e.g., the controller/processor 280) and/or circuitry for detecting (e.g., the circuitry for detecting 732). Means for receiving may include an antenna (e.g., the antennas 252a-252r), a transceiver (e.g., the transceivers 254a-254r), a processor (e.g., the controller/processor 280), and/or circuitry for receiving (e.g., the circuitry for receiving 734). Means for identifying may include a processor (e.g., the controller/processor 280) and/or circuitry for identifying (e.g., the circuitry for identifying 736). Means for communicating may include a processor (e.g., the controller/processor 280) and/or circuitry for communicating (e.g., the circuitry for communicating 738). In certain aspects, various processors and/or various circuitry may include a circuit, a central processing unit (CPU), a graphics processing unit (GPU), a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein.

Figure 8:
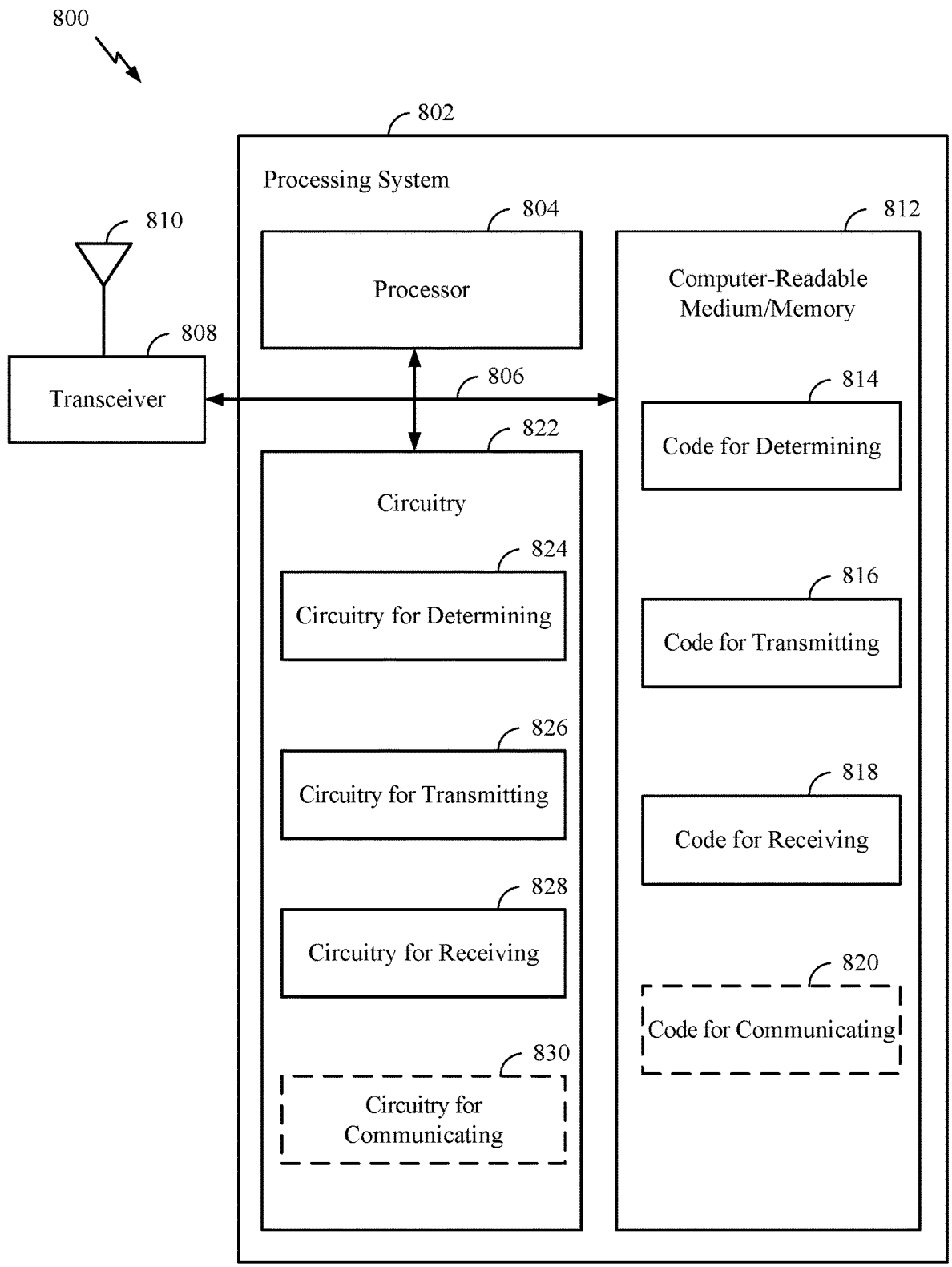
FIG. 8 illustrates a communications device that may include various components configured to perform operations for the techniques disclosed herein in accordance with aspects of the present disclosure.

FIG. 8 illustrates a communications device 800 (e.g., the BS 110a in the wireless communication network 100 of FIG. 1) that may include various components (e.g., corresponding to means-plus-function components) configured to perform operations for techniques disclosed herein, such as the operations illustrated in FIG. 6. The communications device 800 includes a processing system 802 coupled to a transceiver 808 (e.g., a transmitter and/or a receiver). The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 6, or other operations for performing the various techniques discussed herein for beam failure recovery. In certain aspects, the computer-readable medium/memory 812 stores code for determining 814, code for transmitting 816, code for receiving 818, and/or code for communicating 820. In certain aspects, the processing system 802 has circuitry 822 configured to implement the code stored in the computer-readable medium/memory 812. The circuitry 822 is coupled to the processor 804 and/or the computer-readable medium/memory 812 via the bus 806. The circuitry 822 includes circuitry for determining 824, circuitry for transmitting 826, circuitry for receiving 828, and/or circuitry for communicating 830.

Means for determining may include a processor (e.g., the controller/processor 240) and/or circuitry for determining (e.g., the circuitry for determining 824). Means for transmitting may include an antenna (e.g., the antennas 234a-234r), a transceiver (e.g., the transceivers 232a-232r), a processor (e.g., the controller/processor 240), and/or circuitry for transmitting (e.g., the circuitry for transmitting 826). Means for receiving may include an antenna (e.g., the antennas 234a-234r), a transceiver (e.g., the transceivers 232a-232r), a processor (e.g., the controller/processor 240), and/or circuitry for receiving (e.g., the circuitry for receiving 828). Means for communicating may include a processor (e.g., the controller/processor 240) and/or circuitry for communicating (e.g., the circuitry for communicating 830). In certain aspects, various processors and/or various circuitry may include a circuit, a CPU, a GPU, a DSP, an ASIC, a FPGA, or other PLD, discrete gate or transistor logic, discrete hardware components, or any combination thereof designed to perform the functions described herein.

In addition to the examples described above, many examples of specific combinations are within the scope of the disclosure, some of which are detailed below:

Example 1: A method of wireless communication by a user equipment (UE), comprising determining at least one reference signal (RS) associated with a first cell that is configured without a control-resource set (CORESET); monitoring the at least one RS associated with the first cell; and detecting a beam failure on the first cell based on the monitoring of the at least one RS.

Example 2: The method of example 1, wherein the determining the at least one RS is based on one or more transmission configuration indicator (TCI) states associated with the first cell.

Example 3: The method of example 2, wherein the determining the at least one RS further comprises identifying the one or more TCI states among a plurality of TCI states associated with the first cell based on one or more identifier values associated with the plurality of TCI states.

Example 4: The method of example 3, wherein the identifying the one or more TCI states comprises identifying two or more TCI states having a lowest and a second lowest identifier values among the one or more identifier values associated with the plurality of TCI states.

Example 5: The method of example 2, wherein the determining the at least one RS further comprises identifying RSs associated with the one or more TCI states based on periodicities of the RSs, and identifying the RSs as the at least one RS.

Example 6: The method of examples 2-5, further comprising receiving transmissions from a base station via the first cell, and wherein the determining the at least one RS further comprises identifying the one or more TCI states associated with the transmissions.

Example 7: The method of examples 2-6, wherein the one or more TCI states indicate at least one quasi-colocation (QCL) relationship associated with a physical downlink shared channel (PDSCH) on the first cell.

Example 8: The method of example 7, wherein the at least one QCL relationship comprises a spatial reception parameter associated with the PDSCH.

Example 9: The method of example 3, further comprising receiving a configuration of the first cell, and wherein determining the at least one RS further comprises identifying the one or more TCI states among the plurality of TCI states based on the configuration of the first cell if the first cell is configured without a TCI state associated with the at least one RS.

Example 10: The method of examples 1-9, further comprising: receiving one or more indications of one or more TCI states associated with at least one beam failure detection (BFD) RS, wherein the at least one BFD RS is associated with the first cell configured without the CORESET, and wherein the determination of the at least one BFD RS is based on the one or more indications associated with the one or more TCI states.

Example 11: The method of example 10, wherein the one or more TCI states are associated with a PDSCH on the first cell.

Example 12: The method of example 10, wherein the one or more TCI states indicate at least one QCL relationship associated with a PDSCH on the first cell.

Example 13: The method of example 10, wherein the one or more indications are received via at least one of a radio resource control (RRC) configuration message, a medium access control (MAC) control element (CE), downlink control information (DCI), or a combination thereof.

Example 14: The method of example 13, wherein the RRC configuration message indicates a beam failure recovery configuration.

Example 15: The method of example 13, wherein the RRC configuration message indicates that the first cell is configured without the CORESET.

Example 16: The method of examples 1-15, further comprising communicating, with a base station, via the first cell and one or more second cells, wherein the first cell is a secondary cell in a cell group and the one or more second cells comprises a primary cell in the cell group configured with the CORESET.

Example 17: The method of example 16, further comprising: receiving, from the base station on the one or more second cells, signaling for cross-carrier scheduling of transmissions on the first cell.

Example 18: A method of wireless communication by a base station, comprising: determining one or more transmission configuration indicator (TCI) states associated with at least one reference signal (RS) of a first cell that is configured without a control-resource set (CORESET; transmitting, to a user equipment (UE), one or more indications of the one or more TCI states; and receiving an indication of a beam failure associated with the at least one RS of the first cell.

Example 19: The method of example 18, wherein the one or more TCI states are associated with a physical downlink shared channel (PDSCH) on the first cell.

Example 20: The method of example 18, wherein the one or more TCI states indicates at least one quasi-colocation (QCL) relationship associated with a PDSCH on the first cell.

Example 21: The method of examples 18-20, wherein the one or more indications are received via at least one of a radio resource control (RRC) configuration message, a medium access control (MAC) control element (CE), downlink control information (DCI), or a combination thereof.

Example 22: The method of example 21, wherein the RRC configuration message indicates a beam failure recovery configuration.

Example 23: The method of example 21, wherein the RRC configuration message indicates that the first cell is configured without the CORESET.

Example 24: The method of examples 18-23, wherein the one or more indications of the one or more TCI states are associated with at least one beam failure detection (BFD) RS, wherein the at least one BFD RS is associated with the first cell configured without the CORESET.

Example 25: The method of examples 18-24, further comprising: communicating, with the UE, via the first cell and one or more second cells, wherein the first cell is a secondary cell in a cell group and the one or more second cells comprises a primary cell in the cell group configured with the CORESET; and transmitting, to the UE on the one or more second cells, signaling for cross-carrier scheduling of transmissions on the first cell.

Example 26: An apparatus for wireless communication, comprising: a memory; a processor coupled to the memory, the processor and the memory configured to determine at least one reference signal (RS) associated with a first cell that is configured without a control-resource set (CORESET); and a receiver configured to monitor the at least one RS associated with the first cell; wherein the processor and the memory are further configured to detect a beam failure on the first cell based on the monitoring of the at least one RS.

Example 27: The apparatus for example 26, wherein the processor and the memory are further configured to determine the at least one RS based on one or more transmission configuration indicator (TCI) states associated with the first cell.

Example 28: The apparatus for example 26, wherein: the receiver is further configured to receive one or more indications of one or more TCI states associated with at least one beam failure detection (BFD) RS, wherein the at least one BFD RS is associated with the first cell configured without the CORESET; and the processor and the memory are further configured to determine the at least one BFD RS based on the one or more indications associated with the one or more TCI states.

Example 29: An apparatus for wireless communication, comprising: a memory; a processor coupled to the memory, the processor and the memory configured to determine one or more transmission configuration indicator (TCI) states associated with at least one reference signal (RS) of a first cell that is configured without a control-resource set (CORESET); a transmitter configured to transmit to a user equipment (UE) one or more indications of the one or more TCI states; and a receiver configured to receive an indication of a beam failure associated with the at least one RS of the first cell.

Example 30: The apparatus of example 29, wherein the one or more TCI states are associated with a physical downlink shared channel (PDSCH) on the first cell.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using time-division duplex (TDD). In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of the UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5 and/or FIG. 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a user equipment (UE), comprising:
receiving one or more indications of one or more transmission configuration indicator (TCI) states associated with at least one beam failure detection (BFD) RS, wherein the at least one BFD RS is associated with a first cell configured without a control-resource set (CORESET);
  determining at least one reference signal (RS) associated with the first cell;
  monitoring the at least one RS associated with the first cell; and
  detecting a beam failure on the first cell based on the monitoring of the at least one RS.

2. The method of claim 1, wherein the determining the at least one RS is based on the one or more TCI states.

3. The method of claim 2, wherein the determining the at least one RS further comprises identifying the one or more TCI states among a plurality of TCI states associated with the first cell based on one or more identifier values associated with the plurality of TCI states.

4. The method of claim 3, wherein the identifying the one or more TCI states comprises identifying two or more TCI states having a lowest and a second lowest identifier values among the one or more identifier values associated with the plurality of TCI states.

5. The method of claim 2, wherein the determining the at least one RS further comprises identifying RSs associated with the one or more TCI states based on periodicities of the RSs, and identifying the RSs as the at least one RS.

6. The method of claim 2, further comprising:
  receiving transmissions from a base station via the first cell, and wherein the determining the at least one RS further comprises identifying the one or more TCI states associated with the transmissions.

7. The method of claim 2, wherein the one or more TCI states indicate at least one quasi-colocation (QCL) relationship associated with a physical downlink shared channel (PDSCH) on the first cell.

8. The method of claim 7, wherein the at least one QCL relationship comprises a spatial reception parameter associated with the PDSCH.

9. The method of claim 3, further comprising:
  receiving a configuration of the first cell, and wherein determining the at least one RS further comprises identifying the one or more TCI states among the plurality of TCI states based on the configuration of the first cell if the first cell is configured without a TCI state associated with the at least one RS.

10. The method of claim 1, wherein the one or more TCI states are associated with a PDSCH on the first cell.

11. The method of claim 1, wherein the one or more TCI states indicate at least one QCL relationship associated with a PDSCH on the first cell.

12. The method of claim 1, wherein the one or more indications are received via at least one of a radio resource control (RRC) configuration message, a medium access control (MAC) control element (CE), downlink control information (DCI), or a combination thereof.

13. The method of claim 12, wherein the RRC configuration message indicates a beam failure recovery configuration.

14. The method of claim 12, wherein the RRC configuration message indicates that the first cell is configured without the CORESET.

15. The method of claim 1, further comprising communicating, with a base station, via the first cell and one or more second cells, wherein the first cell is a secondary cell in a cell group and the one or more second cells comprises a primary cell in the cell group configured with the CORESET.

16. The method of claim 15, further comprising:
  receiving, from the base station on the one or more second cells, signaling for cross-carrier scheduling of transmissions on the first cell.

17. A method of wireless communication by a base station, comprising:
  determining one or more transmission configuration indicator (TCI) states associated with at least one reference signal (RS) of a first cell that is configured without a control-resource set (CORESET);
  transmitting, to a user equipment (UE), one or more indications of the one or more TCI states, wherein the one or more indications of the one or more TCI states are associated with at least one beam failure detection (BFD) RS, wherein the at least one BFD RS is associated with the first cell; and
  receiving an indication of a beam failure associated with the at least one RS of the first cell.

18. The method of claim 17, wherein the one or more TCI states are associated with a physical downlink shared channel (PDSCH) on the first cell.

19. The method of claim 17, wherein the one or more TCI states indicates at least one quasi-colocation (QCL) relationship associated with a PDSCH on the first cell.

20. The method of claim 17, wherein the one or more indications are transmitted via at least one of a radio resource control (RRC) configuration message, a medium access control (MAC) control element (CE), downlink control information (DCI), or a combination thereof.

21. The method of claim 20, wherein the RRC configuration message indicates a beam failure recovery configuration.

22. The method of claim 20, wherein the RRC configuration message indicates that the first cell is configured without the CORESET.

23. The method of claim 17, further comprising:
  communicating, with the UE, via the first cell and one or more second cells, wherein the first cell is a secondary cell in a cell group and the one or more second cells comprises a primary cell in the cell group configured with the CORESET; and
  transmitting, to the UE on the one or more second cells, signaling for cross-carrier scheduling of transmissions on the first cell.

24. An apparatus for wireless communication, comprising:
  memory;
  one or more processors coupled to the memory, the one or more processors and the memory collectively configured to determine at least one reference signal (RS) associated with a first cell that is configured without a control-resource set (CORESET); and
  a receiver configured to monitor the at least one RS associated with the first cell, wherein the one or more processors and the memory are further configured to detect a beam failure on the first cell based on the monitoring of the at least one RS, wherein the receiver is further configured to receive one or more indications of one or more transmission configuration indicator (TCI) states associated with at least one beam failure detection (BFD) RS, and wherein the at least one BFD RS is associated with the first cell.

25. The apparatus for claim 24, wherein the one or more processors and the memory are further configured to determine the at least one RS based on the one or more TCI states.

26. An apparatus for wireless communication, comprising:
  memory;
  one or more processors coupled to the memory, the one or more processors and the memory collectively configured to determine one or more transmission configuration indicator (TCI) states associated with at least one reference signal (RS) of a first cell that is configured without a control-resource set (CORESET);
  a transmitter configured to transmit to a user equipment (UE) one or more indications of the one or more TCI states, wherein the one or more indications of the one or more TCI states are associated with at least one beam failure detection (BFD) RS, wherein the at least one BFD RS is associated with the first cell; and
  a receiver configured to receive an indication of a beam failure associated with the at least one RS of the first cell.

27. The apparatus of claim 26, wherein the one or more TCI states are associated with a physical downlink shared channel (PDSCH) on the first cell.

* * * * *